W. B. LASHAR.
TIRE GRIP.
APPLICATION FILED JAN. 7, 1911.

1,163,620.

Patented Dec. 7, 1915.

WITNESSES
Jessie B. Kay
Florence E. Wolfe

Walter B. Lashar INVENTOR
BY
Duncan & Duncan ATTORNEYS

UNITED STATES PATENT OFFICE.

WALTER B. LASHAR, OF BRIDGEPORT, CONNECTICUT, ASSIGNOR TO AMERICAN CHAIN COMPANY, INCORPORATED, OF BRIDGEPORT, CONNECTICUT, A CORPORATION OF NEW YORK.

TIRE-GRIP.

1,163,620.   Specification of Letters Patent.   Patented Dec. 7, 1915.

Application filed January 7, 1911. Serial No. 601,286.

*To all whom it may concern:*

Be it known that I, WALTER B. LASHAR, a citizen of the United States, and resident of Bridgeport, county of Fairfield, and State of Connecticut, have made certain new and useful Inventions Relating to Tire-Grips, of which the following is a specification, taken in connection with the accompanying drawing, which forms part of the same.

This invention relates especially to tire grips in which the flexible side members are connected with a number of chain tread members substantially consisting of hardened, unwelded, butted, curbed chain links, the central wearing links being preferably provided with interlocking ends which sufficiently engage so as to prevent in connection with the hardened body of the link, the ends working out of alinement.

Figure 1:
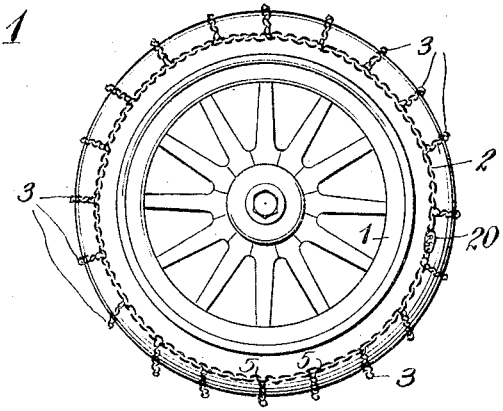
Figure 4:
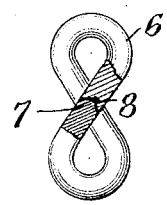
Figure 3:
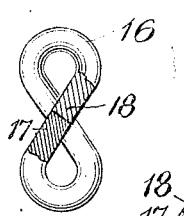
Figure 2:
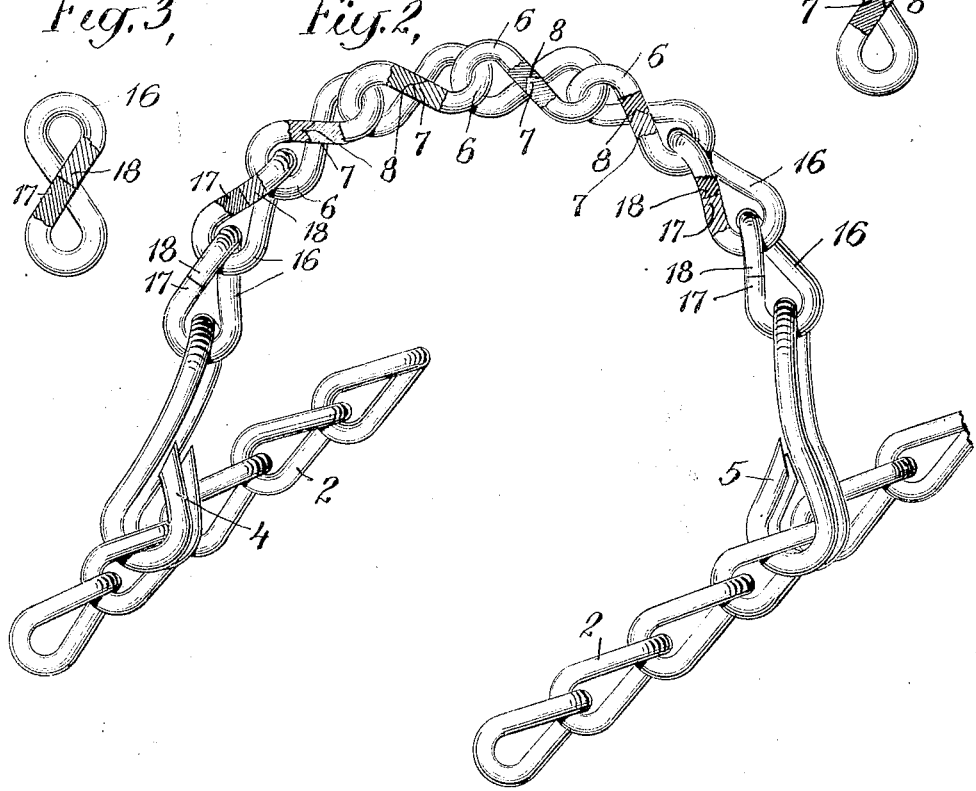

In the accompanying drawing, showing in a somewhat diagrammatic manner, illustrative embodiments of this invention, Figure 1 is an elevation showing a form of grip applied to a wheel. Fig. 2 is an enlarged perspective view showing a tread member and the connected parts of the side members. Fig. 3 is an enlarged view partly in section of one form of link, and Fig. 4 is a corresponding view showing another form of link.

As indicated in the drawings, the grip may comprise side members 2 of flexible character, which may be conveniently formed of chain having their ends provided with any desired form of fastening hook or means 20 by which the grip may be readily attached or removed from the tire of the wheel 1 in the usual way. The tread members 3 may be secured in any desired way to the side members 2 so as to be spaced around the wheel at the desired intervals and preferably be sufficiently loosely arranged as indicated so as to allow the grip to move freely around the tire under service conditions. The attaching means may, if desired, be in the form of special attaching links 4, 5 which may be readily secured to the side chains at the proper intervals to firmly hold the connected tread members thereof, although if desired, the tread members may be secured to the side chains by links similar to those forming the rest of the tread members. With such special attaching links as indicated in Fig. 2, the tread chains may be separately made and sold and if the attaching links are left comparatively soft such separate tread chains may be conveniently attached to the side members as for instance, when it is desired to replace broken or worn treads.

The tread members are preferably formed of hardened, unwelded steel, butted, curbed chain links which, when formed of sufficiently high carbon steel and properly hardened or tempered, may be given sufficient rigidity to retain their shape under service conditions, thus producing a cheap and highly efficient form of chain tread member for such grips. A desirable form of such link is shown in Fig. 3, the link 16 being, if desired, formed of suitable high carbon or special hardening steel such as chrome steel or other suitable composition and the ends 17, 18, of the link being butted closely together so that the hardened link will have sufficient rigidity to hold the ends in proper alinement as well as prevent opening under service conditions. If desired, however, such butted links may be used merely for the lateral securing links of each tread member which are exposed to considerably less wear than the central or wearing links of the tread chains. The central wearing links may in some cases be advantageously provided with suitably interlocking ends which have sufficient engagement so as to prevent lateral displacement of the link ends and correspondingly contribute to proper wearing qualities. Any form of interlocking or interengaging ends may be employed and in Figs. 2 and 4 a suitable substantially conical projection 7 is formed on one end of the material of the link 6 and a corresponding conical recess or depression 8 formed in the other end of the link so that when hardened these interlocking ends effectively prevent lateral displacement and make a firm desirable tread link especially when the link is given a high degree of rigidity by being formed of high carbon steel and suitably hardened or tempered, it being of course understood that similar results may be obtained by suitable case hardening of correspondingly lower or softer steels. As shown in Fig. 2, each tread member may comprise a number of central wearing links 6 having such interlocking ends and connected with one or more lateral securing links 16 on either side, special attaching links or means being if desired, used to attach the tread members to the side chains or members.

Having described this invention in connection with a number of illustrative embodiments, proportions, sizes, shapes and materials of parts, to the details of which disclosure the invention is not of course to be limited, what is claimed as new and what is desired to be secured by Letters Patent is set forth in the appended claims.

1. The tire grip comprising tread members and connected chain side members formed with detachable fastening means to readily apply and remove the grip from a vehicle tire and allow the grip to move freely around the tire under service conditions, said tread members comprising attaching links at either end of the same attaching them to the side members and being otherwise formed of unwelded, hardened steel, butted, curbed links, the central wearing links of said tread members having substantially conically interlocking ends.

2. The tire grip comprising tread members and connected flexible side members formed with detachable fastening means to readily apply and remove the grip from a vehicle tire and allow the grip to move around the tire under service conditions, said tread members comprising attaching means at either end of the same attaching them to the side members and comprising unwelded, hardened steel, butted, curbed links, the central wearing links of said tread members being formed of material having substantially conically interlocking ends located substantially midway between the ends of the links.

3. The tire grip comprising tread members and connected flexible side members formed with fastening means to apply and remove the grip from a vehicle tire and allow the grip to move around the tire under service conditions, said tread members being largely formed of unwelded, hardened steel, butted, curbed links, the central links of said tread members exposed to greatest wear having interlocking ends.

4. The tire grip comprising tread members and connected flexible side members, said tread members consisting largely of unwelded, hardened, butted, curbed links, some of the links of said tread members having interlocking ends to assist in maintaining the alinement of the ends of said links.

5. The tire grip comprising tread members and connected flexible side members formed with fastening means to apply and remove the grip from a vehicle tire, said tread members comprising unwelded, hardened, butted, curbed links having interlocking ends to assist in maintaining the alinement of the ends of said links.

6. The chain tread member for tire grips comprising attaching links at either end of the same to attach said tread member to side members and being otherwise formed of unwelded, hardened steel, butted, curbed links, the butted ends of said links being located intermediate the ends of the corresponding links and the central links of said thread members exposed to greatest wear having interlocking ends to assist in maintaining the alinement of the ends of said links.

7. The chain tread member for tire grips consisting largely of unwelded, hardened, butted, curbed links and comprising links having interlocking ends to assist in maintaining the alinement of the ends of said links.

8. The chain tread member for tire grips comprising unwelded, hardened, butted, curbed links having interlocking ends to assist in maintaining the alinement of the ends of said links.

9. The chain tread member for tire grips consisting largely of unwelded, hardened, butted, curbed links, the butted ends of the link material being located intermediate the ends of the links and the central links of said tread member exposed to greatest wear having interlocking ends to assist in maintaining alinement thereof.

WALTER B. LASHAR.

Witnesses:
HARRY L. DUNCAN,
JESSIE B. KAY.